Oct. 13, 1936.   R. A. WEIDENBACKER   2,057,507
FLOATING MOUNTING
Filed July 5, 1934

WITNESSES

INVENTOR
Russell A. Weidenbacker
BY
Munn Anderson & Liddy.
ATTORNEYS

Patented Oct. 13, 1936

2,057,507

UNITED STATES PATENT OFFICE 2,057,507

FLOATING MOUNTING

Russell A. Weidenbacker, Haverford, Pa.

Application July 5, 1934, Serial No. 733,889

1 Claim. (Cl. 308—26)

This invention relates to an improved floating mounting which may be used for floatingly mounting shafts or other articles, and has for an object to provide an improved construction which is particularly adapted for long or short shafts whereby the bearing of the shafts may be so formed as to yield in a direction at substantially right angles to the axis of the shaft.

Another object of the present invention is to provide a floating mounting which includes part of the bearing for shafts and the like for automobile brakes or other devices, the structure being such that a yieldingly resilient action is provided either in a circular, tangential or radial direction.

A further object of the invention, more specifically, is to provide a bearing wherein there is included a flexible resilient ring of rubber or other suitable material carrying the shaft or other article to be supported, whereby it may move substantially in any direction within certain limits, thus producing a floating action to accommodate the parts to the various strains.

In the accompanying drawing—

Figure 1:
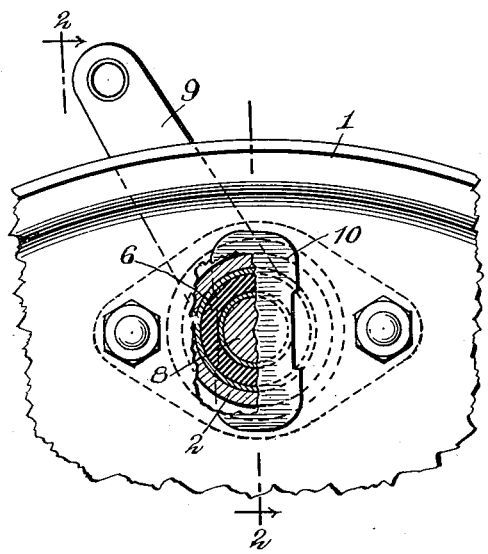
Figure 1 is a view in elevation showing part of the brake mechanism with an embodiment of the invention applied thereto, certain parts being broken away for better illustrating the detailed structure.

The invention is applicable to various uses where a floating mounting is desirable for shafts or other articles, but for the purpose of illustration the same has been shown in the drawing as applied to a mechanical brake and also to a hydraulic brake. The description will, therefore, follow the drawing but it will be understood that the invention may be applied to many other purposes and, in fact, wherever it may properly function.

Referring to the drawing by numerals, 1 indicates the stationary part of a brake structure, which may be of any usual construction, the same supporting a stationary sleeve 2 in any desired manner as, for instance, by being welded, riveted or otherwise rigidly secured thereto. The sleeve 2 is provided with a bore 3 which merges into an enlarged bore 4, said enlarged bore really forming a socket for the reception of a metallic sleeve 5 carrying a resilient elastic sleeve 6 which may be of rubber, fiber or other material which will yield in substantially any direction and will then resume its normal position when released.

Figure 3:
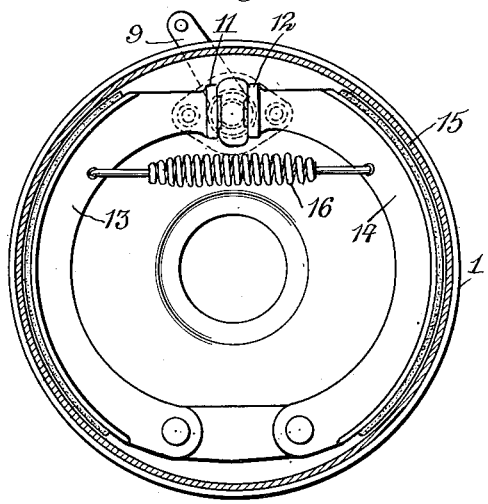
Figure 3 is an elevation with certain parts in section of a brake mechanism including the brake shoes, and an embodiment of the invention applied to the braking shaft.

Arranged interiorly of the sleeve 6 is a metallic bearing sleeve 7 which fits properly against the brake shaft 8, which shaft extends loosely through the bore 3 and is secured to the brake lever 9. A brake cam 10 is secured to the inner end of the shaft and this cam is arranged as shown in Fig. 3, namely, between the ends 11 and 12 of the brake shoes 13 and 14. It will be understood that these brake shoes and associated parts are of well known construction and, therefore, form no part of the present invention except in combination.

Figure 2:
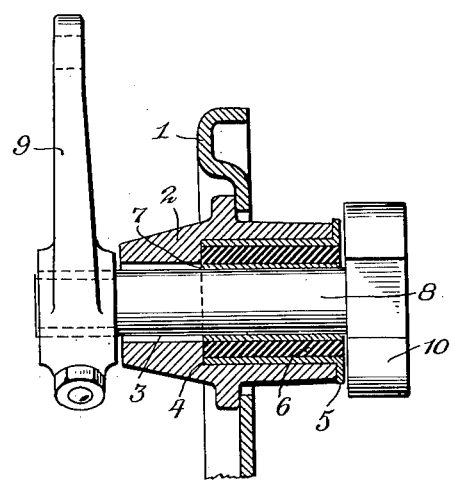
Figure 2 is a sectional view through Fig. 1, approximately on the line 2—2.

When the parts are as shown in Fig. 3, the brake shoes are released and are spaced slightly from the brake drum 15. To apply the brake shoes the lever 9 is swung to the right as shown in Fig. 3. This will shift cam 10 so as to separate the ends 11 and 12 against the action of the spring 16. Sometimes the strain is not evenly distributed, and when this is the case, the bearing is a rigid structure, there will be some considerable wear on the parts, and also an undesirable action of the cam in respect to one of the brake shoes. To eliminate these objections and others the resilient sleeve 6 which may be of rubber or other material, as above mentioned, is arranged as shown in Fig. 2, and consequently when torque is put on the shaft 8 any other than a rotary strain will be transmitted through the metallic bearing sleeve 7 to the resilient sleeve 6, and this latter sleeve will permit the shaft to move slightly out of its normal alignment so as to adjust itself in such a manner as to equalize the strain on the parts.

It has been found by experiment that by an action of this kind the power necessary to secure a desired braking action is greatly reduced, and also that the parts will wear longer. The sleeve 6 will, as a matter of fact, accommodate itself to circumferential, torsional strain, or to any form of strain which is more or less radial in respect to the shaft 8 whereby the shaft 8 may automatically float or move to a position in the center of the strain involved, whereby it will be evenly balanced against the resistance to the power applied.

In making the sleeve 6 it may be made from any desired material whereby a flexible elastic resilient body is presented, for instance, spring fabric, rubber, rubberized fabric, artificial rubber or a mixture of artificial rubber and fabric, so that a pliable spring resilient flexible body will be presented. When this is mounted in a suitable support the shaft or other member being supported will in a certain sense, float and yet be held in proper operative position for performing its usual function. When the invention is used as shown in the accompanying drawing, namely, on a braking device, it permits the drag of the brake drum in a direction of its rotation which corresponds to the direction of motion of the vehicle to which the brake drum is secured and, in a certain sense, to carry or rotate the brake band around in the same direction for a short distance, thus transferring this wrapping or drag as a further force on the other shoe or shoes by reason of its ability to flex or move its position and thereby increase the pressure of the other shoe or shoes against the drum by reason of its rotating force. In actual tests this floating mounting has shown very decided advantages or improvements in what may be called stopping distance without injuring any of the parts.

I claim:—

A floating mounting for brake shafts and the like, comprising in combination a support having a passageway therethrough, said passageway being enlarged at one end, said passageway accommodating a brake shaft, a tubular pliable resilient sleeve integral throughout arranged in the enlarged part of said passageway and extending from one end thereof to the other, and a pair of spaced metal sleeves carried by said pliable resilient sleeve, each of said sleeves being continuous throughout, one of said metal sleeves acting as a bearing sleeve for said shaft and positioned within said tubular pliable resilient sleeve, and the other as a mounting for said pliable resilient sleeve, said other metal sleeve surrounding said resilient sleeve.

RUSSELL A. WEIDENBACKER.